United States Patent
Eto et al.

(10) Patent No.: US 6,345,390 B1
(45) Date of Patent: Feb. 5, 2002

(54) BIDIRECTIONAL DIGITAL SIGNAL TRANSMISSION SYSTEM AND REPEATER FOR THE SAME

(75) Inventors: Yoshizumi Eto, Sagamihara; Nobuo Murata, Musashino, both of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/877,560

(22) Filed: Jun. 17, 1997

Related U.S. Application Data (63) Continuation-in-part of application No. 08/361,724, filed on Dec. 23, 1994, now Pat. No. 5,701,581, and a continuation-in-part of application No. 08/662,141, filed on Jun. 12, 1996, now Pat. No. 6,009,305.

(30) Foreign Application Priority Data

| Dec. 28, 1993 | (JP) | 5-352868 |
| May 27, 1994 | (JP) | 6-115244 |
| Jun. 14, 1995 | (JP) | 7-147506 |
| Jun. 18, 1996 | (JP) | 8-156836 |

(51) Int. Cl.$^7$ .................. H04N 7/173; H04N 5/222; H04L 12/16; H04J 3/17

(52) U.S. Cl. ................. 725/127; 348/14.01; 348/14.11; 348/722; 370/263; 370/433; 370/458

(58) Field of Search ................. 725/105, 127; 348/211, 212, 722, 14.01, 14.05, 14.08, 14.1, 14.11, 14.12, 14.13; 370/259, 260, 263, 293, 433, 458, 521

(56) References Cited

U.S. PATENT DOCUMENTS

| 4,543,609 A | 9/1985 | Smith ........................ 348/212 |
| 4,581,647 A | 4/1986 | Vye ........................... 348/212 |
| 4,644,524 A | 2/1987 | Emery ........................ 370/29 |

(List continued on next page.)

FOREIGN PATENT DOCUMENTS

| EP | 0271969 | 6/1988 | ............ H04N/7/18 |
| EP | 0589657 | 3/1994 | ............ H04N/7/14 |
| EP | 0661883 | 7/1995 | ............ H04N/7/18 |
| JP | 62-53095 | 3/1987 | |
| WO | 91/02414 | 2/1991 | ............ H04B/1/66 |

OTHER PUBLICATIONS

*Patent Abstracts of Japan*, vol. 11, No. 240 (E–529), Aug. 6, 1987 (for JP–A–62–53095, H. Kuroda et al., published Mar. 7, 1987).

(List continued on next page.)

*Primary Examiner*—John W. Miller
(74) *Attorney, Agent, or Firm*—Antonelli, Terry, Stout & Kraus, LLP (57) ABSTRACT

A bidirectional digital signal transmission system includes a transmission line, and video instruments respectively connected to both ends of the transmission line. In each of the video instruments, a digitized signal is multiplexed on a time division basis and compressed in a time base, thereby generating a transmission signal constituted by repetition of a signal period and a quiescent period. The transmission signal generated by one of the video instruments is transmitted during the quiescent period of the transmission signal generated by another one of the video instruments, thereby realizing bidirectional digital signal transmission. The system further includes a repeater circuit inserted in the transmission line at an intermediate location thereof to compensate for deterioration of the signal occurring during transmission over the transmission line. The repeater circuit includes a switch device for preventing a transmission signal feedback loop from being formed in the repeater circuit.

12 Claims, 5 Drawing Sheets

U.S. PATENT DOCUMENTS

| | | | | |
|---|---|---|---|---|
| 4,782,393 A | 11/1988 | Kawamura | ................. | 348/212 |
| 4,878,242 A | 10/1989 | Springer et al. | ............ | 379/204 |
| 4,888,795 A | 12/1989 | Ando et al. | ................... | 348/18 |
| 4,949,181 A | 8/1990 | Elberbaum | ................. | 348/212 |
| 4,954,886 A | 9/1990 | Elberbaum | ................. | 348/212 |
| 5,079,634 A | 1/1992 | Hosono | ..................... | 348/212 |
| 5,229,850 A | 7/1993 | Toyoshima | ................ | 358/108 |
| 5,231,492 A | 7/1993 | Dangi et al. | .................. | 348/15 |
| 5,371,534 A | 12/1994 | Dagdeviren et al. | ......... | 348/16 |
| 5,392,284 A | 2/1995 | Sugiyama | ................... | 348/17 |
| 5,396,269 A | 3/1995 | Gotoh et al. | ................. | 348/14 |
| 5,400,068 A | 3/1995 | Ishida et al. | ................. | 348/16 |
| 5,402,418 A | 3/1995 | Shibata et al. | ............... | 370/62 |
| 5,408,261 A | 4/1995 | Kamata et al. | ............. | 348/17 |
| 5,412,418 A | 5/1995 | Nishimura et al. | .......... | 348/17 |
| 5,450,140 A | 9/1995 | Washino | ..................... | 348/212 |
| 5,490,167 A | 2/1996 | Sumi et al. | | |
| 5,623,304 A | 4/1997 | Ota et al. | ................... | 348/212 |
| 5,633,873 A | 5/1997 | Kay et al. | ................... | 370/433 |
| 5,663,961 A | 9/1997 | McRoberts et al. | ........ | 370/473 |
| 5,701,581 A | 12/1997 | Eto et al. | .................... | 348/212 |
| 5,726,980 A * | 3/1998 | Rickard | ..................... | 725/127 |
| 5,815,794 A * | 9/1998 | Williams | ................... | 725/127 |
| 5,821,995 A | 10/1998 | Nisikawa | | |
| 5,978,651 A | 11/1999 | Eto et al. | | |

OTHER PUBLICATIONS

J. Kirsten et al., "One coax cable carries video and power", *Electrical Design News*, vol. 36, No. 6, Mar. 14, 1991, pp. 137–138, 140.

M. Kato et al., "Visual Communication System in an Apartment House Using Only Twisted Paired Cable", *IEEE Transactions on Consumer Electronics*, vol. 40, No. 3, Aug. 1994, pp. 418–426.

U.S. Patent application Ser. No. 08/635,699 filed on Apr. 22, 1996.

U.S. Patent application Ser. No. 08/839,489 filed on Apr. 14, 1997.

* cited by examiner

BIDIRECTIONAL DIGITAL SIGNAL TRANSMISSION SYSTEM AND REPEATER FOR THE SAME

CROSS-REFERENCES TO RELATED APPLICATIONS

This application is a continuation-in-part of application Ser. No. 08/361,724 filed on Dec. 23, 1994, now U.S. Pat. No. 5,701,581, and is also a continuation-in-part of application Ser. No. 08/662,141 filed on Jun. 12, 1996, now U.S. Pat. No. 6,009,305, which is a continuation-in-part of application Ser. No. 08/361,724 filed on Dec. 23, 1994, now U.S. Pat. No. 5,701,581. The disclosures of these applications are incorporated herein by reference.

This application is related to application Ser. No. 08/635,699 filed on Apr. 22, 1996, now U.S. Pat. No. 5,821,995, which is a continuation-in-part of application Ser. No. 08/361,724 filed on Dec. 23, 1994, now U.S. Pat. No. 5,701,581, one of the parent applications of the present continuation-in-part application.

This application is also related to application Ser. No. 08/839,489 filed on Apr. 14, 1997, now U.S. Pat. No. 5,978,651, which is a continuation of application Ser. No. 08/361,724, filed on Dec. 23, 1994, now U.S. Pat. No. 5,701,581, one of the parent applications of the present continuation-in-part application.

BACKGROUND OF THE INVENTION

The present invention relates generally to a bidirectional digital signal transmission system for transmitting bidirectionally digital signals such as digital video signals, audio signals, control signals and others by using a single transmission line (cable). More particularly, the invention is concerned with a repeater apparatus installed on the transmission line in such bidirectional digital signal transmission system.

The television camera system employed, for example, in the broadcasting field is generally comprised of a camera head unit for converting optical images into electric signals and a camera control unit for controlling the camera head unit by shaping and processing the electric signals appropriately.

To this end, a video signal, an audio signal (or speech signal) and others generated in the camera head unit are transmitted from the camera control unit to the camera head unit, whereas video signals for monitoring, audio or speech signals for communication are transmitted to the camera head unit from the camera control unit.

The signals mentioned above can be transmitted by using a coaxial triplex cable known as the triax cable. In that case, the aforementioned signals have to be multiplexed. Heretofore, these analogue signals are modulated and multiplexed on a frequency division basis for realizing the bidirectional transmission.

SUMMARY OF THE INVENTION

An object of the present invention is to provide a bidirectional digital signal transmission system for transmitting and receiving digital signals each containing video information and audio information substantially in realtime from both ends of a single transmission line and a repeater apparatus for extending a transmission distance in the bidirectional digital signal transmission system.

Another object of the invention is to provide a repeater apparatus which is so arranged that internal circuits thereof do not form a feedback loop for the signals transmitted from both ends of the transmission line.

In view of the above and other objects which will become apparent as the description proceeds, there is provided according to an aspect of the present invention a bidirectional digital signal transmission system which includes a transmission line and video instruments connected to the transmission line at both ends thereof, respectively, wherein in each of the video instruments, a digitized signal is multiplexed on a time division basis and compressed in a time base, whereby a transmission signal constituted by repetition of a signal period and a quiescent period is generated, and wherein the transmission signal generated by one of the video instruments is transmitted during the quiescent period of the transmission signal generated by the other video instruments to thereby realize a bidirectional digital signal transmission. The system includes a repeater apparatus inserted in the transmission line at an intermediate location thereof for compensating for deterioration of the signal brought about by the transmission line. The repeater apparatus includes a switch unit for preventing a transmission signal feedback loop from being formed internally of the repeater apparatus.

Furthermore, according to another aspect of the present invention, there is provided a repeater apparatus for a bidirectional digital signal transmission system in which digital signals each containing video information and audio information are transmitted alternately from both ends of a transmission line periodically at a predetermined interval for allowing the digital signals to be transmitted and received, respectively, at both ends of the transmission line substantially on a real time basis. The repeater apparatus is disposed on the transmission line and includes a first compensation circuit for compensating for deterioration of a first digital signal transmitted from one end of the transmission line to the other end, the deterioration being brought about by the transmission line, a second compensation circuit for compensating for deterioration of a second digital signal transmitted from the other end of the transmission line to the one end, a control circuit for detecting at least one of the first digital signal and the second digital signal to thereby generate a control signal, and a switch unit for selectively opening/closing a signal path for one of the first compensation circuit and second compensation circuit in response to the control signal.

The above and other objects, features and attendant advantages of the present invention will more easily be understood by reading the following description of the preferred embodiments thereof taken, only by way of example, in conjunction with the accompanying drawings. dr

BRIEF DESCRIPTION OF THE DRAWINGS

In the course of the description which follows, reference is made to the drawings, in which.

DESCRIPTION OF THE PREFERRED EMBODIMENTS

Before entering into detailed description of the exemplary or preferred embodiments of the present invention, technical background thereof will be reviewed in some detail for having better understanding of the invention. Disclosed in copending U.S. patent application Ser. No. 08/361,274 filed on Dec. 23, 1994 now U.S. Pat. No. 5,701,581, which has two inventors in common with the present application is a digital video signal multiplex transmission method and an apparatus for carrying out the same in which analogue video signal, audio signal (or speech signal) and others are converted into corresponding digital signals, multiplexed on a time-division basis (time-division-based multiplexing) and compressed in the time base (time base compression), whereby a transmission signal (i.e., signal for transmission) which is composed of repetition of signal periods and quiescent periods is generated in each of a camera head unit and a camera control unit which are interconnected by a single coaxial cable, wherein the transmission signal originating in one of the camera head unit and the camera control unit is transmitted during the quiescent period of the transmission signal originating in the other. In this way, mutual or bidirectional transmission is realized between the camera head unit and the camera control unit.

Figure 2:
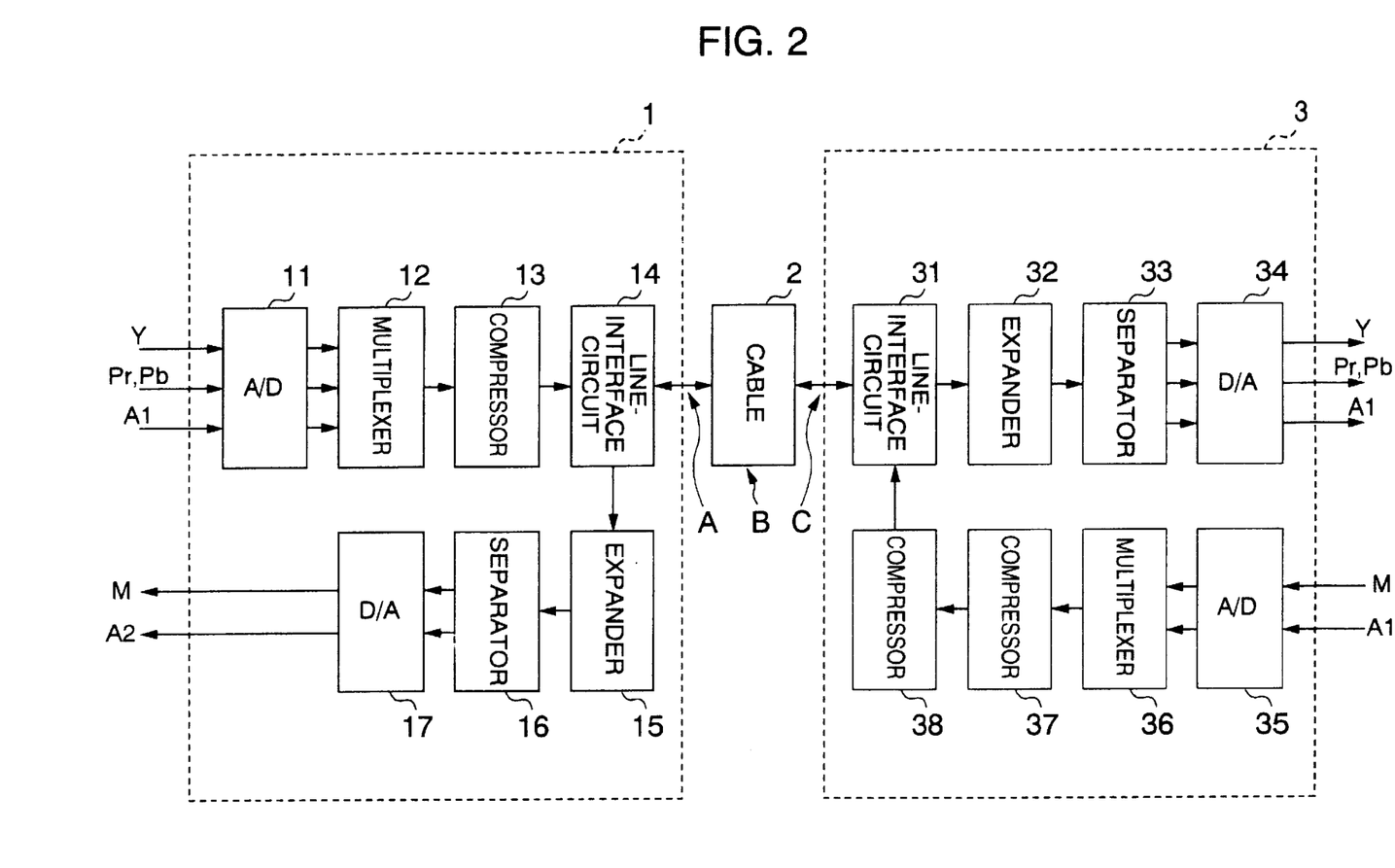
FIG. 2 is a block diagram showing a system configuration of a bidirectional transmission system according to the present invention.

FIG. 2 is a block diagram showing a configuration of the transmission system for the bidirectional transmission of the video signal and the audio signal between the camera head unit and the camera control unit after the A/D (analogue to digital) conversion and the time-division-based multiplexing, as mentioned above. In this conjunction, FIG. 4 shows signal forms of the signals handled in the bidirectional transmission system.

Supplied to a transmission unit provided in association with the camera head unit (hereinafter referred to as the camera-head-associated transmission unit) are analogue luminance signal, chrominance signals Pr and Pb and audio signal A1 which are converted into corresponding digital signals, respectively, by means of an A/D (analogue to digital) converter 11. These digital signals are multiplexed by a multiplexer 12 (see FIG. 4 at (a)), output signals of which then undergo a time base compression processing, whereby an intermittent digital transmission signal constituted by repetition of a signal period and a quiescent period (non-signal period) (see FIG. 4 at (b)) is generated to be sent onto a cable 2 via a line-interface circuit 14 (see FIG. 4 at (c)).

In a transmission unit 3 installed in association with the camera control unit (this transmission unit will hereinafter be referred to as the camera-controller-associated transmission unit), the digital signal undergone the time base compression and multiplexing mentioned above is received by a line-interface circuit 31 to be subsequently expanded by an expander 32 and separated into the luminance signal Y, the chrominance signals Pr and Pb and the audio signal A1 which are then converted into corresponding analogue signals, respectively, by means of a D/A (digital to analogue) converter 34.

Figure 4:
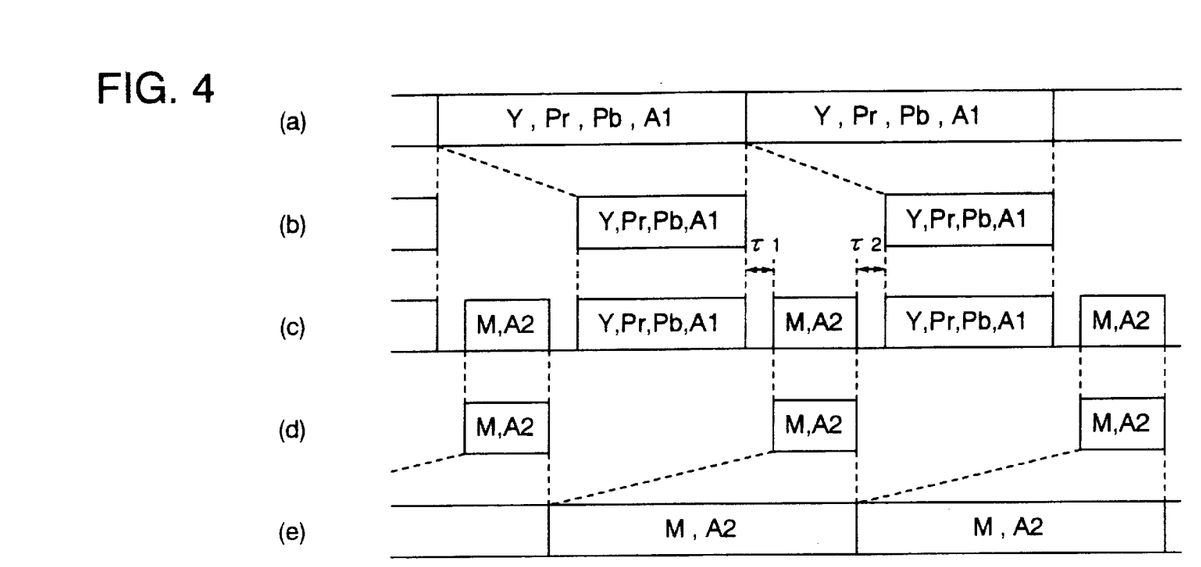
FIG. 4 is a waveform diagram illustrating formats of signals transmitted in the bidirectional transmission system according to an embodiment of the invention.

On the other hand, analogue video signal M and audio signal A2 to be sent back are supplied to the camera-controller-associated transmission unit 3 to be converted into corresponding digital signals which are multiplexed by a multiplexer 36 (see FIG. 4 at (e)), the output of which then undergoes a data compression processing by means of a compressor 37 and then a time base compression processing by a compressor 38, whereby an intermittent digital signal composed of a repeated sequence of signal periods and quiescent periods is generated. The digital signal mentioned above is sent out onto the cable 2 via the line-interface circuit 31 during the quiescent period for which the transmission signal from the camera head unit is absent (see FIG. 4 at (c)). The aforementioned digital signal undergone the time base compression and multiplexing is received by the camera-head-associated transmission unit 1 via the line-interface circuit 14 and expanded by an expander 15 to be subsequently separated into a sent-back video signal M and a sent-back audio signal A2, both of which are converted into corresponding analogue signals by means of a D/A (digital to analogue) converter 17.

Figure 3:
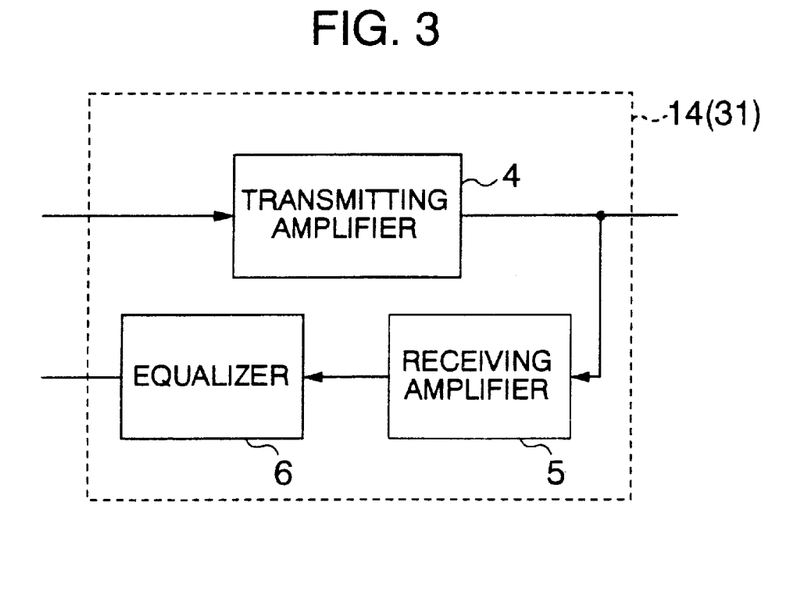
FIG. 3 is a block diagram showing a structure of a line-interface circuit employed in the bidirectional transmission system shown in FIG. 2.

FIG. 3 shows in detail a structure of the line-interface circuit 14 (31) employed in the system shown in FIG. 2. As can be seen from FIG. 3, the line-interface circuit 14 (or 31) is comprised of a transmitting amplifier 4 for sending out the signal onto a transmission line, a receiving amplifier 5 for receiving the signal from the transmission line and an equalizer 6 provided for compensating for distortions from which the reception signal suffers in the course of transmission due to cable characteristics.

As is apparent from the foregoing, in the transmission signal described above, the video signal and the audio signal to be sent to the camera control unit from the camera head unit on one hand and the video signal and the audio signal to be sent to the camera head unit from the camera control unit on the other hand are so transmitted that they occupy mutually different time periods, respectively, with interposition of time gaps, as is illustrated in FIG. 4. In this way, the bidirectional transmission can be realized by using a single cable without mutual interference.

Figure 7:
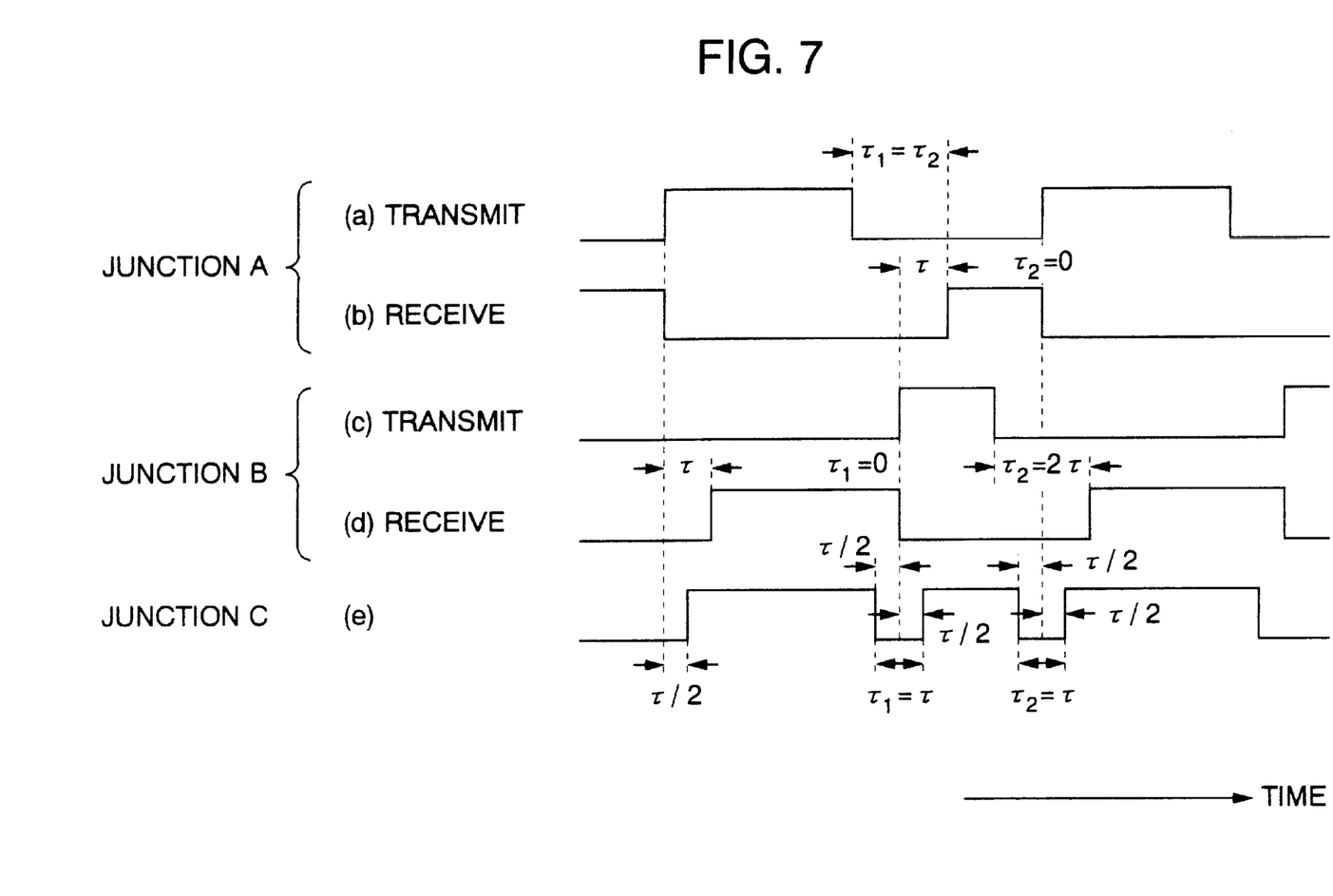
FIG. 7 is a signal waveform diagram for illustrating operation of a repeater/transmission system according to an embodiment of the invention.

Now referring to FIG. 7 which is a signal waveform diagram, description will be made in detail of the signal forms at the both ends A and C and an intermediate point B of the signal cable 2. In FIG. 7, there is illustrated at (a) a transmission signal sent from the camera-head-associated transmission unit 1 at the connecting node or junction A between the camera-head-associated transmission unit 1 and the cable 2, wherein a high level indicates the signal period with a low level indicating the quiescent period (non-signal period). Illustrated at (b) in FIG. 7 is a reception signal from the camera-controller-associated transmission unit 3 at the junction A. Further, illustrated at (c) in FIG. 7 is a transmission signal from the camera-controller-associated transmission unit 3 at the junction (connecting node) C between the camera-controller-associated transmission unit 3 and the cable 2. Furthermore, illustrated at (d) in FIG. 7 is a reception signal from the camera-head-associated transmission unit 1 at the junction C. Finally, illustrated at (e) in FIG. 7 is a transmission signal at an intermediate point on the cable 2.

The transmission signal at the junction A (see FIG. 7, (a)) is transmitted along the cable 2 and undergoes delay of a time τ at the junction C, as can be seen in FIG. 7 at (d)). The τ indicates a delay time in the cable 2. Mixing or cross-talk between the transmission signal and the reception signal can be evaded by setting the start point of the signal transmitted from the camera-controller-associated transmission unit 3 at the junction C (FIG. 7, (c)) so that the start point coincides with the end point of the reception signal at the junction C or alternatively makes appearance after the end point of the reception signal at the junction C (FIG. 7, (d)).

On the other hand, the transmission signal at the junction C (see FIG. 7, (c)) is transmitted over the cable 2 and accompanied with a delay time τ at the junction A, as illustrated in FIG. 7 at (b). By setting the start point of the signal sent from the camera-head-associated transmission unit 1 at the junction A so that the start point coincides with the end point of the reception signal at the junction A (see FIG. 7 at (b)) or makes appearance later than the end point of the reception signal, mixing between the transmission signal and the reception signal can be avoided.

At the intermediate point on the cable 2, both the transmission signals sent from the junction A and the junction B undergo a delay of τ/2. As can be seen in FIG. 7 at (e), both the transmission signals can exist on the transmission line without being mutually mixed.

In the exemplary case illustrated in FIG. 7, a time gap $\tau_1$ intervening between the fall of the transmission signal (FIG. 7, (a)) and the rise of the reception signal (FIG. 7, (b)) at the junction A is equal to 2τ, while a time gap $\tau_2$ intervening between the rise of the transmission signal (see FIG. 7, (a)) and the fall of the reception signal (see FIG. 7, (b)) is zero (i.e., the rise of the transmission signal and the fall of the reception signal coincide with each other). Further, the time gap $\tau_1$ between the rise of the transmission signal (FIG. 7, (c)) and the fall of the reception signal (FIG. 7, (d)) at the junction C is zero (coincidence in time), while time gap $\tau_2$ intervening between the fall of the transmission signal (FIG. 7, (c)) and the rise of the reception signal (FIG. 7, (d)) is equal to 2τ. Further, at the intermediate junction B, both time gaps $\tau_1$ and $\tau_2$ of the transmission signals from the junctions A and C are equal to the delay time τ.

Thus, it can be understood that the sum of the time gaps $\tau_1$ and $\tau_2$ accompanying the bidirectional transmission signals is equal to 2τ at any point on the cable 2. In order to avoid the mixing of the transmission signals in the two directions on the cable 2, the time gap between the transmission signal and the reception signal at both ends of the cable has to be so set as to satisfy both the conditions that $\tau_1 \geq 2\tau$ at the junction A and $\tau_2 \geq 2\tau$ at the point C, where τ represents the delay time brought about by the cable 2.

When plural video signals and audio signals are digitized and multiplexed on the time division basis, the signal resulting therefrom has an extremely high bit rate. By way of example, let's suppose that the luminance signal component of the video signal sent from the camera head unit is sampled at 13.5 MHz with two chrominance signals being sampled at 6.75 MHz, whereon the sampled signals are quantized at 10 bits, then the bit rate amounts to 270 Mbps. In the case of the video signal sent from the camera control unit, some deterioration in the picture quality is permissible. In view of this fact, the data carried by the signals may be compressed to one fifth. Even in that case, the bit rate is as high as 54 Mbps. Accordingly, when audio signals for several channels are added, the total sum of the bit rates will readily exceed 330 Mbps.

When the digital data of high bit rate is transmitted through a coaxial cable, loss in the cable becomes remarkable, as a result of which limitation is imposed to the distance for the data transmission. By way of example, the transmission allowable distance is ordinarily on the order of 300 meters, although it depends on the scheme adopted for compensating for the cable loss.

In the data transmission between the camera head unit and the camera control unit, the distance on the order of 300 meters is usually tolerable. However, in order to make such bidirectional transmission available for various practical applications, there arises a demand for the capability of extending the transmission distance.

In the light of the state of the art described above, it is contemplated with the present invention to compensate for the cable loss and increase the transmission distance in a system for bidirectional signal transmission of video signals, audio signals, and others between the camera head unit and the camera control unit by using a single cable.

To this end, the present invention proposes that at least one stage of a repeater unit is provided at an intermediate point on the transmission line for compensating for the loss brought about by the transmission and that the repeater unit is equipped with a switch unit for preventing the signals transmitted bidirectionally from forming a loop.

One of the signals for transmission is a video signal for which data is compressed. Accordingly, the compression ratio of the video signal is controlled in dependence on the transmission distance of the transmission line which in turn depends on the number of the repeater units as provided so that a total sum of the time periods during which the individual transmission signals are absent on the transmission line is at least twice as long as the delay time of the transmission line.

Owing to the provision of the repeater unit, the cable loss can be compensated for, whereby the transmission distance can be increased. By way of example, when n stages of repeater units (where n is an integer equal to or greater than one) are inserted every 300 meters in the transmission system elucidated herein-before, then the transmission distance is n×300 meters. In other words, the permissible transmission distance can be increased by a factor of (n+1).

Figure 1:
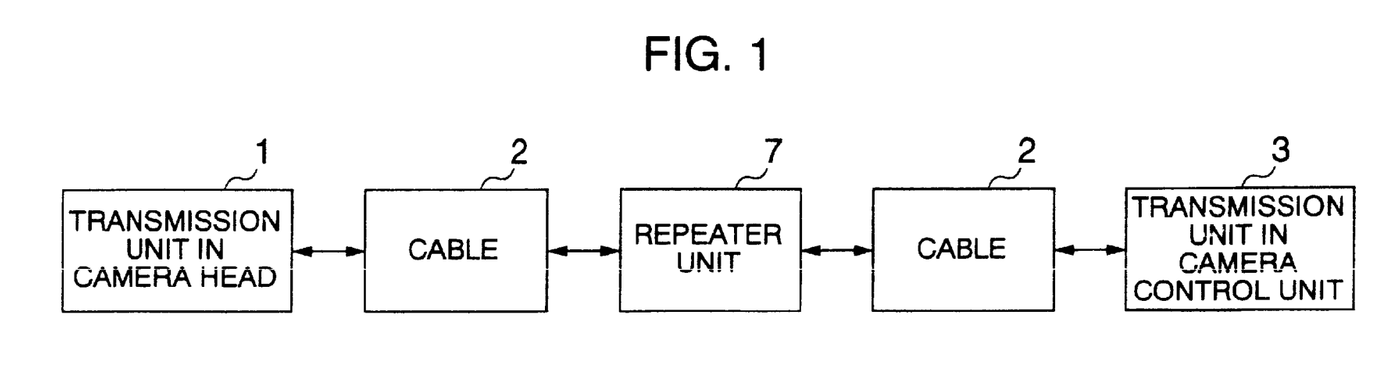
FIG. 1 is a schematic block diagram showing a basic arrangement of a bidirectional digital signal transmission system having a repeater apparatus according to an embodiment of the present invention.

FIG. 1 is a schematic block diagram showing a basic arrangement of the bidirectional digital signal transmission system according to an embodiment of the present invention. As can be seen in the figure, a repeater unit 7 is inserted in a cable line 2 extending between a camera-head-associated transmission unit 1 and a camera-controller-associated transmission unit 3 both of which are equivalent to those described hereinbefore by reference to FIG. 2. A transmission signal sent via the cable 2 from the camera-head-associated transmission unit 1 or the camera-controller-associated transmission unit 3 is compensated for the loss involved in the transmission along the cable 2 by means of the repeater unit 7, whereon the compensated signal is sent out onto the succeeding cable 2. Since transmission signals are sent from both the camera head unit and the camera control unit, respectively, the repeater unit 7 has to be capable of serving for the functions for reception, compensation and transmission or sending of these bidirectional transmission signals.

Figure 5:
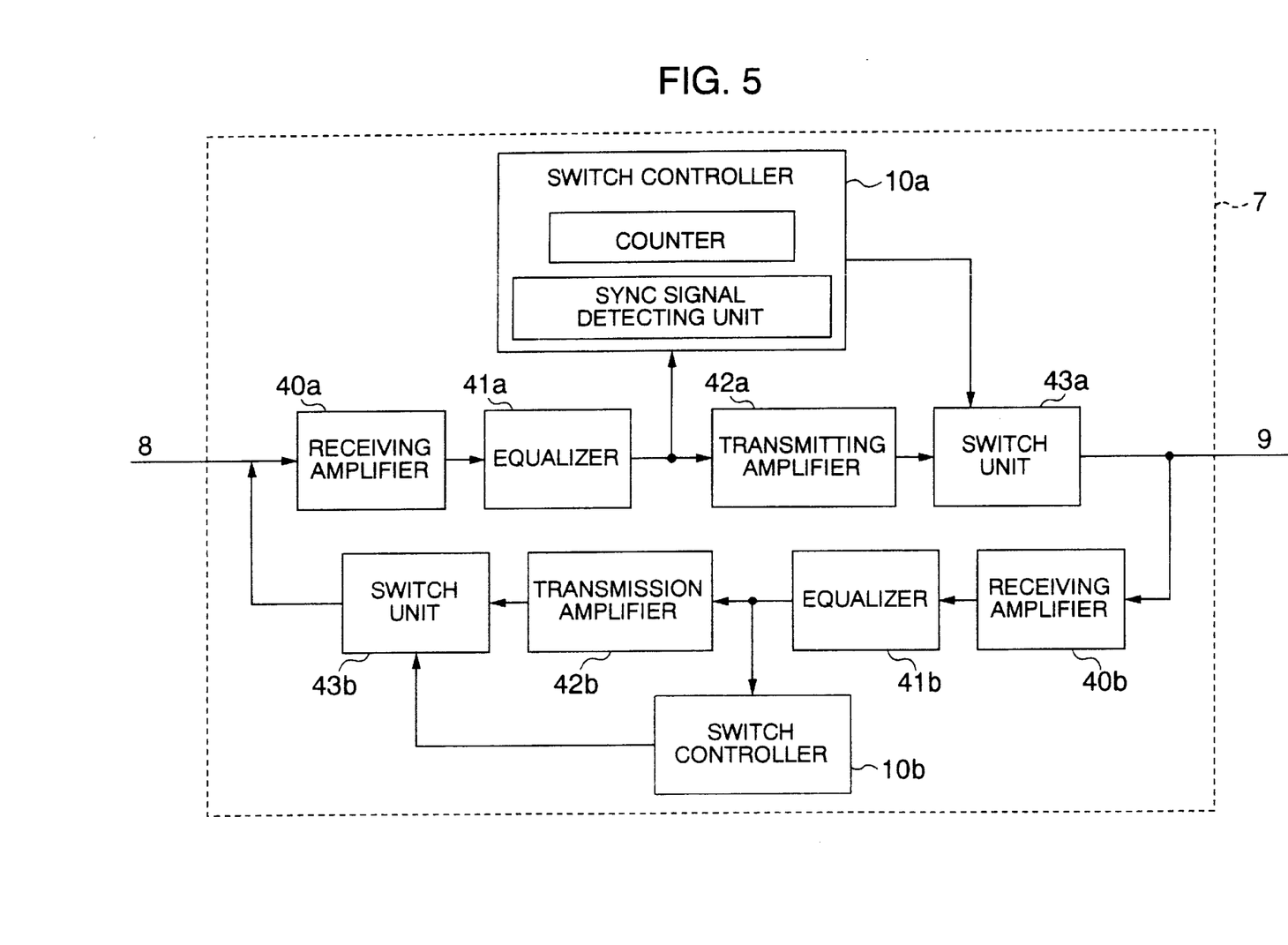
FIG. 5 is a block diagram showing a structure of an repeater unit according to an embodiment of the present invention.

FIG. 5 shows in detail a structure of the repeater unit 7 which is designed to serve for the functions mentioned above. In the figure, reference numerals 8 and 9 denote input/output terminals, respectively, of the repeater unit 7.

Referring to FIG. 5, the transmission signal inputted to the input/output terminal 8 is amplified by a receiving amplifier 40*a* and compensated for the cable loss (i.e., loss involved in the course of transmission on the cable 2) by means of an equalizer 41a to be subsequently outputted via the input/output terminal 9 by way of a transmitting amplifier 42a and a switch unit 43a.

Parenthetically, the equalizer 41a may be so implemented as to reproduce the signal blunted after equalization into binary digital signals having mutually different fixed values or remedying the blunted signal so as to have uniformized pulse widths by using a reference clock signal.

On the other hand, the transmission signal inputted via the input/output terminal 9 is amplified by a receiving amplifier 40b, compensated for the cable loss by means of an equalizer 41b to be outputted via the input/output terminal 8 by way of a transmitting amplifier 42b and a switch unit 43b.

At this juncture, it should be noted that when the signal inputted via the input/output terminal 8 is amplified by the receiving amplifier 40a, compensated for the cable loss by the equalizer 41a, amplified by the transmitting amplifier 42a and then by the receiving amplifier 40b, again compensated for the cable loss by the equalizer 41b and fed back to the receiving amplifier 40a via the transmitting amplifier 42b, there is formed a signal circulating loop, which gives rise to an oscillation phenomenon. In this conjunction, it should however be appreciated that the transmission signals inputted via the input/output terminals 8 and 9 need not exist concurrently at a same time point, as can be seen in FIG. 4. Accordingly, the oscillation phenomenon mentioned above can be avoided by inserting the change-over switch.

In the system shown in FIG. 5, the switch units 43a and 43b are inserted at the output sides of the transmitting amplifiers 42a and 42b, respectively. It should however be understood that the switch unit 43a may be provided in association with the transmitting amplifier 42a, the receiving amplifier 40a or the equalizer 41a because the function of the switch unit 43a is to break the signal circulating loop mentioned previously. Same holds true for the switch unit 43b.

More specifically, the switch unit 43a is changed over to the conducting or on-state during a time period in which the transmission signal (b) sent from the camera head unit to the camera control unit exists (see FIG. 4) and otherwise to the non-conducting or off-state. Similarly, the switch unit 43b is changed over to the on-state during a time period in which the transmission signal to the camera head unit from the camera control unit exists and otherwise to the non-conducting state.

In this conjunction, it should be added that the conducting time period mentioned above may penetrate or partially overlap the time gap $\tau_1$, $\tau_2$. What is important is that there exists no time period during which both the switch units 43a and 43b are simultaneously in the conducting state. Thus, the aforementioned signal circulating loop is constantly intercepted, leaving no room for occurrence of the oscillation phenomenon.

The control for changing over the switch units 43a and 43b as described above is in charge of switch controllers 10a and 10b, respectively. More specifically, the switch controller 10a, 10b detects a break in the signal sequence (c) shown in FIG. 4, i.e., identifies discriminately a time zone in which the transmission signal sent from the camera head unit to the camera control unit exists and a time zone in which the transmission signal sent from the camera control unit to the camera head unit exists, whereby the change-over of the switch unit 43a, 43b is controlled in dependence on the result of the detection.

In this conjunction, the time zone in which the transmission signal exists can be detected in the following manner.

The transmission signal sent from the camera head unit as well as the transmission signal sent from the camera control unit (see FIG. 4 at (b) and (d)) usually contains at a leading portion of the transmission signal a synchronizing signal indicating the start of the transmission signal. The switch controller 10a, 10b can detect the start (break) of the transmission signal by detecting the synchronizing signal. The signal period or duration of the transmission signal illustrated in FIG. 4 at (b), (c) is determined previously. Accordingly, by counting the number of data contained in the transmission signal, starting from the time point at which the synchronizing code is detected, the end of the transmission signal can equally be detected. Further, the transmission signal illustrated in FIG. 4 at (b), (c) exhibits a periodicity. Accordingly, once the start or end of the transmission signal has been detected, then repeated detection of the synchronizing signal can be omitted, because the start and the end of the succeeding transmission signal can then be detected only on the basis of the result of the data number count operation mentioned above.

Figure 6:
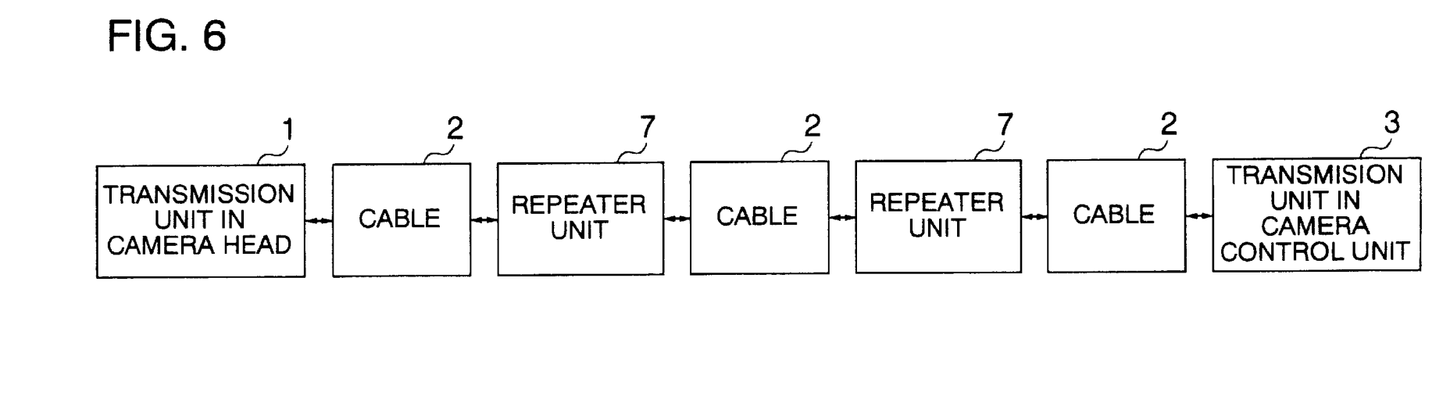
FIG. 6 is a block diagram showing a configuration of a bidirectional digital signal transmission system employing a repeater unit according to another embodiment of the present invention.

In the system shown in FIG. 1, one repeater unit 7 is inserted in the cable 2. However, this is only for the illustrative purpose. Two or more repeater units 7 may be inserted, as illustrated exemplarily in FIG. 6. The transmission distance in total can be increased correspondingly.

At this juncture, it should be mentioned that the time gap $\tau_1$, $\tau_2$ shown in FIG. 7 at (e) must have a value equal to or greater than the delay time $\tau$ involved in the transmission on the cable, which provides the condition that the bidirectional signals can not exist concurrently at both ends of the cable 2 of the system shown in FIG. 2.

For the reason mentioned above, when the transmission distance is increased owing to the insertion of the repeater units 7 with the delay time increasing correspondingly, there arises necessity for increasing the time gap $\tau_1$, $\tau_2$. Of course, the time gap $\tau_1$, $\tau_2$ may initially be set at a fixed value satisfying the above-mentioned condition for a presumed maximum transmission distance. In that case, however, if the actual transmission distance is shorter than the presumed transmission distance, the transmission efficiency will be degraded because of the fixed value of the time gap $\tau_1$, $\tau_2$. As can readily be understood, the time gap represents a useless time zone or period during which no signal is transmitted. Accordingly, as the time gap increases, the amount of data which can be transmitted decreases correspondingly.

Such being the circumstances, it is desirable to set the necessary minimum time gap in correspondence to the transmission distance extended due to insertion of the repeater unit 7. However, change of the preset time gap which is accompanied with a corresponding change of the transmissible data amount leads to modification or alteration of the transmission format. Needless to say, it is troublesome to alter the transmission format every time when the number of the repeater units as inserted is changed.

Additionally, in view of the fact that the transmission signal sent from the camera control unit to the camera head unit is primarily a compressed video signal, the following measures are adopted according to an aspect of the invention. Namely, when the amount of data for transmission decreases due to insertion of the repeater unit 7 for the purpose of extending the transmission distance, the compression ratio of the transmission signal sent from the camera control unit to the camera head unit is increased to thereby reduce the amount of information because more or less deterioration in the quality of picture data is permissible, to thereby transmit the video signal with a decreased amount of data or codes. The time rendered available due to the reduction of the data amount is allocated to the delay time $\tau_1$ or $\tau_2$ for the increase thereof.

On the contrary, when the transmission distance is decreased due to removal of the repeater unit 7, the compression ratio of the video signal to be sent from the camera control unit to the camera head unit is deceased to thereby allow the video signal ensuring a high picture quality to be sent with a correspondingly increased amount of data or codes. The time required to this end can be made available owing to decreasing of the delay time $\tau_1$ or $\tau_2$.

The signal compression ratio mentioned above can be set manually by operator in advance in consideration of the number of the repeater units to be inserted or the cable length as a whole. Additionally, the optimal compression ratio can be automatically set in the manner mentioned below. At first, it is presumed that the transmission is started immediately after the end of the reception signal (FIG. 7, (b)). In that case, when the compression ratio is initially set at a sufficiently large value, there makes appearance a dead or non-occupied time zone between the end of the reception signal (FIG. 7, (d)) and the start of the transmission signal (FIG. 7, (c)) on the side of the camera control unit. This empty time zone is measured by means of a counter, on the basis of which the compression ratio is so controlled that it decreases to a preset sufficiently small reference value. Ideally, the reference value should be zero. However, the reference value can be set to a value close to zero in practical applications by taking into consideration some margin or tolerance.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. By way of example, only one switch controller may be provided for controlling both the switch units 43a and 43b. Further, only one switch unit may be disposed at a branch point between the output of the transmitting amplifier 42a and the input of the receiving amplifier 40b. In that case, the switch controller may be so designed as to control the switch units such that the output of the transmitting amplifier 42a is coupled to the cable 2 upon detection of the transmission signal sent from the camera head unit while intercepting the input of the receiving amplifier 40b from the cable 2. Additionally, the switch controller may be so designed as to control the switch units so that the output of the transmitting amplifier 42a is disconnected from the cable 2 upon detection of the transmission signal from the camera control unit while coupling the input of the receiving amplifier 40b to the cable 2. Furthermore, as another exemplary embodiment of the present invention, the power supply to the circuit extending from the receiving amplifier 40b to the transmitting amplifier 42b is interrupted when the switch unit 43a is conducting with the switch unit 43b being off, while the power supply to the circuit extending from the receiving amplifier 40a to the transmitting amplifier 42a is interrupted when the switch unit 43b is conducting with the switch unit 43a being off, to thereby stop the operation of the bidirectional digital signal transmission system by applying a method disclosed in U.S. patent application Ser. No. 08/662,141 filed on Jun. 12, 1996, now U.S. Pat. No. 6,009,305. Accordingly, all suitable modifications and equivalents may be resorted to, falling within the spirit and scope of the invention.

As is apparent from the foregoing description, in the bidirectional digital signal transmission system according to the present invention, the distance for bidirectional transmission of video, audio, control and other signals can be set at a desired value while compensating for the cable loss.

What is claimed is:

1. A bidirectional digital signal transmission system including a transmission line and video instruments connected to said transmission line at both ends thereof, respectively, wherein in each of said video instruments, a digitized signal is multiplexed on a time division basis and compressed in a time base, whereby a transmission signal constituted by repetition of a signal period and a quiescent period is generated, said transmission signal generated by one of said video instruments is transmitted during the quiescent period of the transmission signal generated by another one of said video instruments to thereby realize a bidirectional digital signal transmission, said system comprising:

a repeater circuit inserted in said transmission line at an intermediate location thereof for compensating for deterioration of the signal brought about during transmission by way of said transmission line;

wherein said repeater circuit includes switch means for preventing a transmission signal feedback loop from being formed in said repeater circuit.

2. A bidirectional digital signal transmission system according to claim 1, one component of said transmission signal being a video signal having video data compressed, wherein compression ratio of said video signal being adjusted in dependence on a transmission distance of said transmission line which in turn depends on a number of said repeater circuits as inserted, and wherein a total sum of time periods during which the transmission signals of both of said video instruments do not concurrently exist on said transmission line is set at least equal to twice a delay time inherent to said transmission line.

3. A bidirectional digital signal transmission system according to claim 1, wherein the one of said video instruments is a television camera head unit, while the other one of said video instruments is a television camera control unit.

4. A bidirectional digital signal transmission system according to claim 1, said switch means including a switch circuit for interrupting a signal path for a transmission signal from one of said video instruments.

5. A repeater apparatus for a bidirectional digital signal transmission system in which digital signals each containing video information and audio information are transmitted alternately from both ends of a transmission line periodically at a predetermined interval for allowing said digital signals to be transmitted and received, respectively, at both ends of said transmission line substantially on a real time basis, said repeater apparatus being disposed on said transmission line and comprising:

a first compensation circuit for compensating for deterioration of a first digital signal transmitted from one end of said transmission line to the other end, said deterioration being brought about by said transmission line;

a second compensation circuit for compensating for deterioration of a second digital signal transmitted from said other end of said transmission line to said one end, said deterioration being brought about by said transmission line;

a control circuit for detecting at least one of said first digital signal and said second digital signal to thereby generate a control signal; and switch means for opening/closing a signal path for one of said first compensation circuit and second compensation circuit in response to said control signal.

6. A repeater apparatus according to claim 5, wherein each of said first and second digital signals contains a synchronizing signal, said control circuit including:

means for detecting said synchronizing signal; and counter means for measuring a predetermined time, starting from the detection of said synchronizing signal, wherein said switch means interrupts the signal path for said first or second compensation circuit during a period corresponding to said predetermined time in response to said control signal.

7. A repeater apparatus according to claim 6, wherein an input terminal of said first compensation circuit and an output terminal of said second compensation circuit are connected to one end of said transmission line, while an output terminal of said first compensation circuit and an input terminal of said second compensation circuit are connected to the other end of said transmission line, said switch means including:

a first switch circuit capable of selectively opening and closing a connection path between the output terminal of said first compensation circuit and the other end of said transmission line; and a second switch circuit capable of selectively opening and closing a connection path between the output terminal of said second compensation circuit and the one end of said transmission line.

8. A repeater apparatus according to claim 7, wherein said control circuit generates a control signal for closing said first switch circuit upon detection of presence of a synchronizing signal in said first digital signal while generating a control signal for opening said first switch circuit unless said synchronizing signal of said first digital signal is detected, whereas upon detection of a synchronizing signal in said second digital signal, said control circuit generates a control signal for closing said second switch circuit while generating a control signal for opening said second switch circuit unless the synchronizing signal of said second digital signal is detected.

9. A repeater apparatus according to claim 7, wherein said control circuit generates a control signal for closing said first switch circuit and opening said second switch circuit upon detection of presence of a synchronizing signal in said first digital signal while generating a control signal for opening said first switch circuit and closing said second switch circuit unless said synchronizing signal of said first digital signal is detected.

10. A repeater apparatus according to claim 7, wherein said control circuit generates a control signal for closing said second switch circuit and opening said first switch circuit upon detection of presence of a synchronizing signal in said second digital signal while generating a control signal for opening said second switch circuit and closing said first switch circuit unless said synchronizing signal of said second digital signal is detected.

11. A repeater apparatus according to claim 7, wherein each of said first compensation circuit and said second compensation circuit includes an equalizer for processing said first or second digital signal in accordance with predetermined values so that amplitude and pulse width thereof are restored close to those of the original digital signal.

12. A repeater apparatus according to claim 5, said control circuit further comprising:

means for stopping operation of either one of said first and second compensating circuits in dependence on said control signal.

* * * * *